March 19, 1968     W. A. WALL, JR     3,373,914
AUTOMATIC WELDING SPEED CONTROLLER
Filed Dec. 30, 1965     2 Sheets-Sheet 2

INVENTOR.
WILLIAM A. WALL, JR.

BY *G. H. McCoy*

ATTORNEYS

United States Patent Office 3,373,914
Patented Mar. 19, 1968

3,373,914
AUTOMATIC WELDING SPEED CONTROLLER
William A. Wall, Jr., Madison, Ala., assignor to the United States of America as represented by the Administrator of the National Aeronautics and Space Administration
Filed Dec. 30, 1965, Ser. No. 517,869
10 Claims. (Cl. 228—8)

The invention described herein may be manufactured and used by or for the government of the United States of America for governmental purposes without the payment of any royalties thereon or therefor.

The invention relates to a welding device and more particularly to an automatic welding torch speed controller.

Automatic welders produce work which is more uniform and more reliable than is possible by hand welding. Moreover, where weight is a consideration automatic welders are used to reduce the weight of the weld material. However, difficulties arise in using automatic welders when the work surfaces are curved in a random manner, when it is desired to weld contoured surfaces or objects having unusual physical shapes, or in any case where there is misalignments of parts and welder.

A particular problem with automatic welders welding contoured surface is to maintain the torch tip at a fairly constant velocity. This is necessary in order to obtain the desired uniformity. Some of the automatic welder controls in the prior art maintain a constant weld speed through the use of a wheel or gear driven tachometer to send a signal proportional to the work speed. Programmed control, either numerical or analog, can also be used. Still another way to maintain constant speed control is through the use of pulse devices to generate a signal voltage proportional to the work speed.

The principal disadvantage of slow speed tachometer sensing is that where low work speed is concerned tachometers must usually be geared up in order to generate a smooth voltage. This gearing in turn requires that considerable torque must be applied to the shaft by the pickup wheel. Hence, tachometer pickup control is subject to wheel slippage at slow speeds unless there is considerable pressure applied to the wheel, particularly on a wheel which is not directly geared to the device being monitored.

Programmed control requires elaborate tooling and expensive computer computation to be successfully applied. Programming also requires close tolerances of both tooling and parts since events must take place at certain placements, intervals or times. If the parts to be welded have unusual shapes and are too large to be held rigidly in tooling jigs to close tolerances, programming can quickly become very difficult and expensive. In addition, any change in the shape to be welded would necessitate a revision of the program. Programming simply does not lend itself in many areas to the lightweight tooling concept presently being favored in industrial production work.

Linear pulse pickoff lends itself to the disadvantages of: (a) amplifier drift and gain variation and (b) errors introduced by low frequency pulse to analog conversion, (c) high cost of low torque pulsing devices.

Accordingly, it is the object of this invention to provide an automatic weld speed controller which can maintain a welding torch tip at a substantially constant speed even when welding contoured surfaces or unusual physical shapes.

A further object is to provide an automatic weld speed controller which can maintain the tip of a welding torch at a substantially constant speed when the distance from the work surface to the weld carriage varies in a random manner.

These and other objects are accomplished in the instant invention in which there is provided a welding torch carriage which also supports a speed sensing wheel and a wheel operated synchro controlled transmitter. The small pickup wheel transduces work speed into synchro shaft speed. A synchro controlled transformer is connected to the synchro transmitter and a drive motor is geared to the synchro transformer. A difference amplifier in circuit with the transformer and the drive motor receives error signals from the synchro transmitter through the synchro transformer and transmits them to the drive motor, so as to cause the drive motor to rotate in a direction to reduce the error signals. Thus the speed of the gear motor accurately and smoothly tracks the speed of the welding torch through the use of a closed loop servo system.

The gear motor directly drives a tachometer or rate-generator. Therefore, it follows that the voltage output of the rate-generator represents the instantaneous speed of the welding torch. This voltage output is then compared in a second difference amplifier with a fixed voltage which represents the desired torch tip speed.

The resulting difference voltage controls the input into a known type of electronic governor and governor control potentiometer, which inturn varies the speed of the weld carriage drive motor.

The governor is controlled by a time-on-energization relay which allows the weld carriage a time delay of about 1.5 seconds to come up to a stable speed before the automatic control takes over. Working in conjunction with the time-on-energization relay is a gear motor operating a clutch and brake. This gear motor-clutch-brake assembly transmits the output from the second difference amplifier to the governor. The gear motor receives the difference voltage output of the difference amplifier and in turn drives the governor control potentiometer. During the period before the time delay has run, the clutch disconnects the gear motor from the governor and the brake locks the governor control potentiometer in its initial position. This allows initial smooth starting of the weld carriage. At the end of the 1.5 second time delay, automatic control is initiated. The brake is released and the clutch connects the gear motor drive to the governor control potentiometer.

The invention will be more fully understood by the following detailed description when taken together with the accompanying drawings in which:

FIGURE 3 shows a more detailed pictorial diagram of the instant invention.

Figure 1:
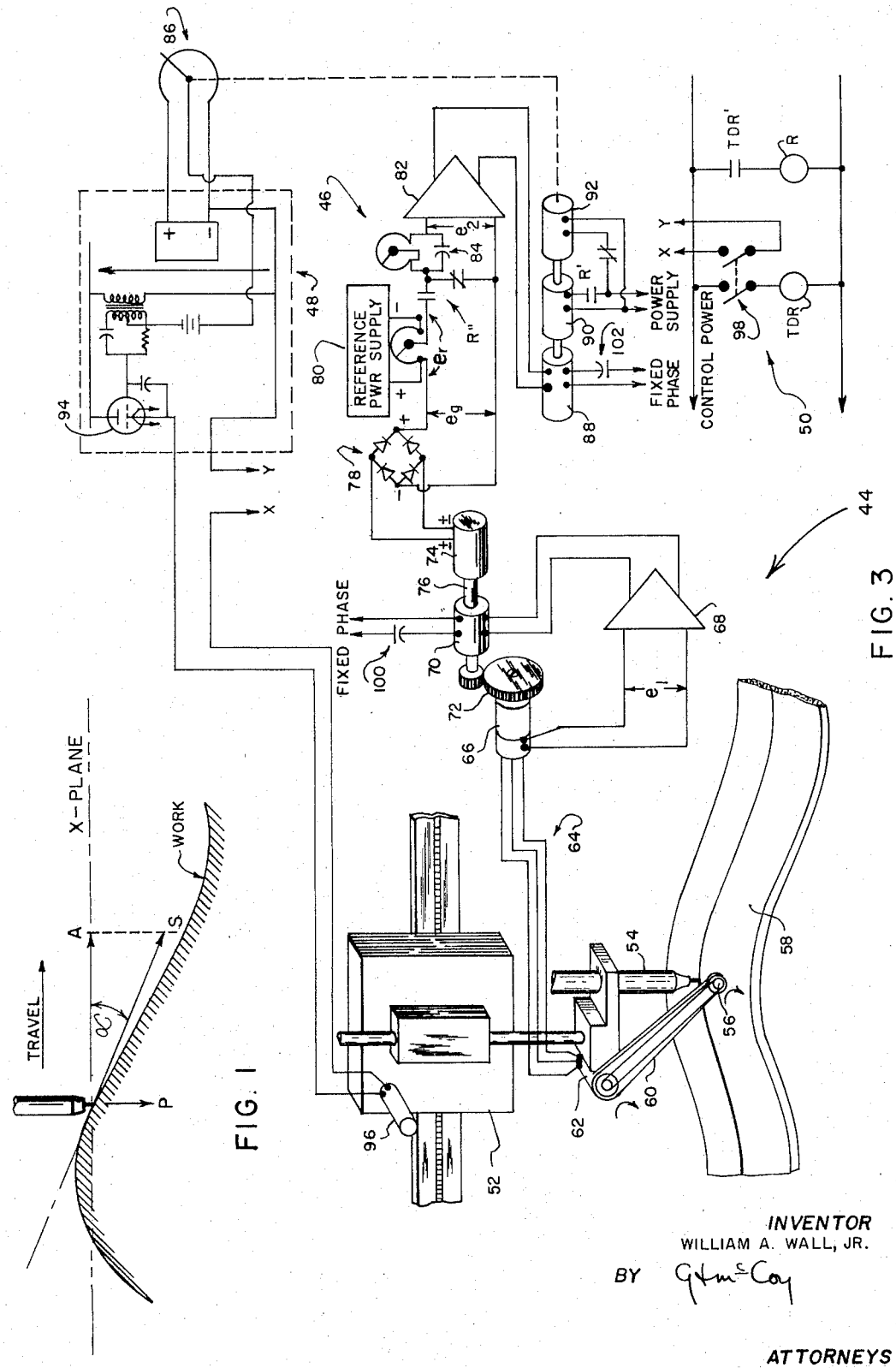
FIGURE 1 is a diagram showing the vector relationship between welding torch tip speed in the horizontal plane and actual welding tip work speed, when welding random curved work.

Referring now to the drawings, FIGURE 1 demonstrates that if the welding torch is traveling a constant speed in the X-plane as indicated by vector A, the instantaneous torch tip to work speed, vector S, will be directly proportional to the secant of the angle alpha provided that the torch is maintained a fixed height above the work by a proximity vector P. Therefore, the torch tip speed may be expressed by the equation, $$S = A \text{ secant } \alpha \qquad (1)$$

where:

$A$ = torch speed in the X-plane
$S$ = instantaneous torch tip speed
$P$ = proximity speed By inspection of Equation 1 above, it can be seen that:

$$A = \frac{S}{\text{secant }\alpha} = S \cos\alpha$$

Thus, carriage speed must be varied to hold a constant weld speed under the conditions imposed by FIGURE 1.

Figure 2:
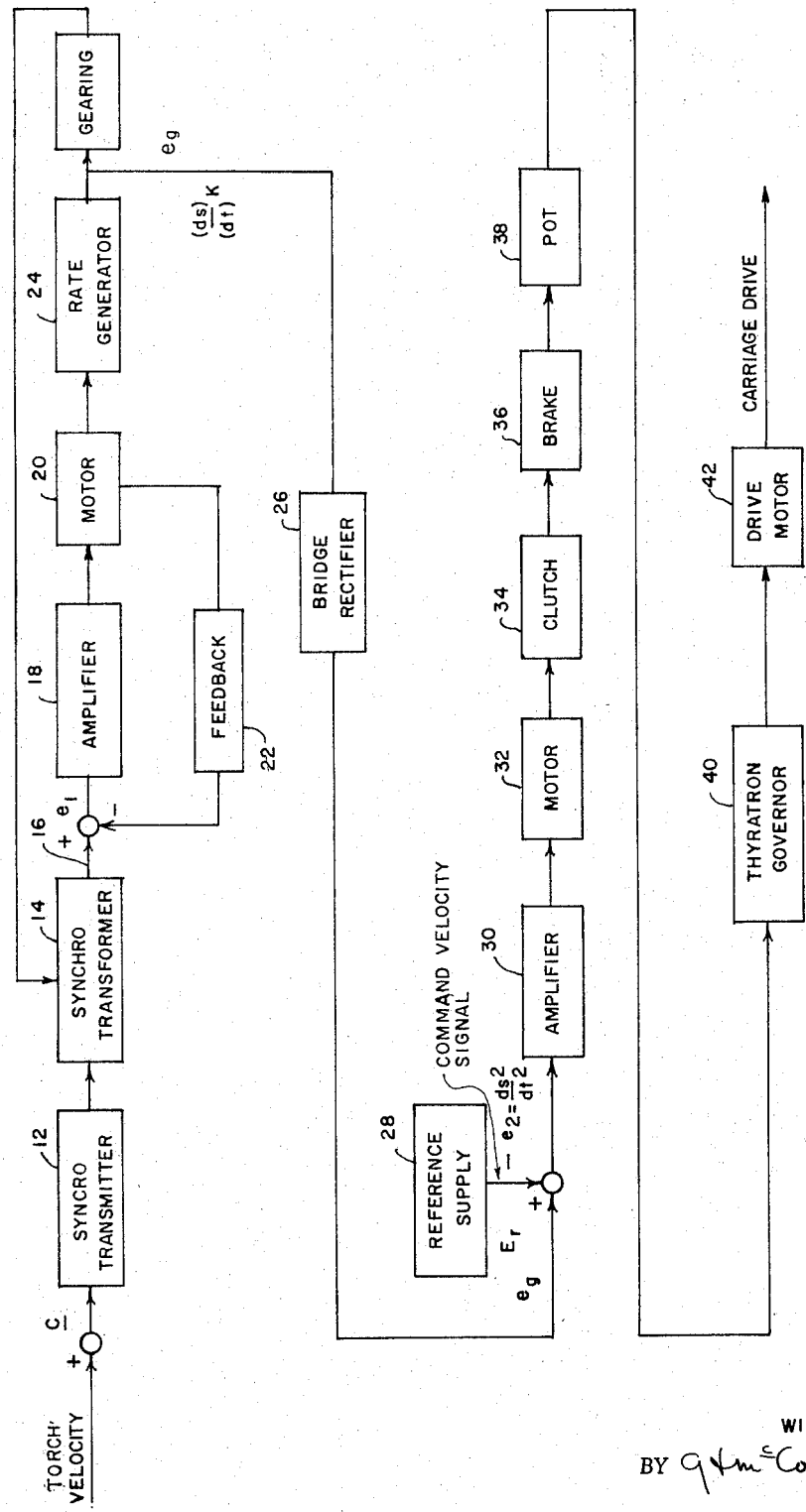
FIGURE 2 shows a block diagram of the instant invention.

Looking now at the block diagram shown in FIGURE 2, the speed of the welding torch is fed mechanically to a set of synchros 12 and 14. Synchro 12 feeds an error signal 16 through the second synchro 14 and a difference amplifier 18 to a drive motor 20. The motor 18 rotates the second synchro 14 in such a direction as to reduce the error signal. Thus, the second synchro 14 closely tracks the first synchro 12 through an integral feedback servo amplifier, which includes feedback circuit 22. Continuing with the top line of the block diagram of FIGURE 2, the motor 18 drives a rate-generator 24 which produces a voltage output $e_g$ representing the instantaneous speed of the weld torch tip. This voltage output passes through a bridge rectifier 26 and is bucked against a reference supply 28, producing a difference voltage $e_2$ which is amplified (at 30) and fed through a motor 32, a clutch 34, and a brake 36 to a governor control potentiometer 38 and thyratron governor 40. The governor controls the speed of the carriage drive motor 42, thus driving the carriage at a speed which will produce a substantially constant work velocity at the tip of the welding torch.

In FIGURE 3 is shown a pictorial detailed diagram of the automatic welding torch speed control. It can be seen that the welding speed control has four distinct parts, each part having its own function. The principal parts are the velocity tracker and analog generator 44, the reference and differential amplifier circuit 46, the drive motor governor 48, and the controls 50.

Looking first at the velocity tracker and analog generator shown generally at 44, and more particularly at the welding torch carriage 52, it may be seen that the welding torch carriage supports the welding torch 54 and a small neoprene rubber-tired speed sensing wheel 56 which tracks the movement of the torch on a parallel path along the work piece 58. The wheel is connected through a direct belt or chain drive 60 to a synchro control transmitter 62. The output of the synchro control transmitter 62 is fed over a three-wire connection 64 into a matched synchro control transformer 66 and through the control transformer into a difference amplifier 68. The difference amplifier 68 is in turn connected to a two-phase motor 70 which is geared back (at 72) to the synchro control transformer 66. Thus, movement of the pickup wheel 56 imparts a shaft rotation to the synchro control transmitter 62 which generates an error signal $e_1$ which in turn is fed through the synchro control transformer 66 into difference amplifier 68. Error signal $e_1$ is amplified through amplifier 68 to excite motor 70, which rotates synchro control transformer 66, through a gear reducer 72, in a direction so as to reduce the error voltage $e_1$. In this manner, a smooth tracking circuit is formed, and synchro control transformer 66 always very closely tracks the synchro control transmitter 62 through an integral feedback servo amplifier.

The tachometer or rate-generator 74 is directly connected to the shaft 76 of the motor 70 driving the synchro control transformer 66. Therefore the voltage output of the rate-generator 74 is proportional to the speed of rotation of the synchros 62 and 66 and the pickup wheel 56. Since the angular rotation of the synchros is proportional to the instantaneous work velocity $ds/dt$, then the r.p.m. of the rate generator is $$\frac{ds}{dt}(K)$$

where K is a gear ratio between the motor and the synchro control transformer. The system has thus transposed a mechanical velocity into a smooth electrical signal whose amplitude is proportional to the rate of rotation of the pickup wheel. A bridge rectifier 78 at the output of the rate generator 74 polarizes the voltage regardless of the direction of rotation of the synchros, and renders the circuit independent of the direction of movement.

The reference and differential amplifier correction circuit shown generally at 46 is directly connected to the output of the rate generator 74 and the bridge rectifier 78. This circuit includes a reference power supply 80, a servoamplifier 82 and a filter circuit 84. The circuit has a purpose of comparing the output voltage of the rate generator 74 with a pre-set reference voltage in order to determine a difference voltage which controls the governor. In order to accomplish this purpose, the circuit receives the output voltage $e_g$ from the rate generator and compares it to a manually pre-set reference voltage $e_r$. The difference voltage $e_2$ is fed into servoamplifier 82 as an error voltage, and is amplified to drive potentiometer 86 through a clutch 90 and brake 92, the function of which is to provide smooth starting. Potentiometer 86 is only driven if an error voltage exists between the output of the generator 74 and the reference supply 80. The error voltage $e_2$ is actually the second differential of the instantaneous velocity equation, and hence, represents the necesesary acceleration required to correct the speed. Also a part of this same circuit is an adjustable RC filter 84, which serves to further stabilize amplifier 82 by dampening voltage transients in the input signal.

The final link in the speed control system is a standard commercially available AC or DC motor drive electronic governor shown generally at 48, such as is available under the trade name of Linde, or such as is described in Chapters 15 and 16, Electronics for Industry, Bendz, John Wiley and Sons, Inc., 1948. Therefore, a detailed discussion of the internal function of the thyratron governor 48 is not considered necessary here. It is considered sufficient to point out that the voltage amplitude of the thyratron 94 is determined by the setting of a voltage dividing potentiometer 86 which is connected to the governor. Essentially, potentiometer 86 determines the speed of the torch tip since it determines the output of the motor drive governor 48. Therefore, all the preceding components in the system have the ultimate purpose of automatically operating potentiometer 86 and allowing it to regulate the output voltage of the Linde governor.

In operation, the welding carriage drive motor 96 is continually changing speed. Since the pickup wheel 56 senses any change in speed, a small signal change into amplifier 68 is reflected as a proportionally larger voltage change at the output terminals of the rate-generator 74. In turn, this new instantaneous voltage $e_g$ is compared with the stable reference voltage $e_r$, and an error voltage $e_2$ results. This resulting error signal $e_2$ is then amplified to rotate the setting of the potentiometer 86 until the motor governor 94 corrects the speed error, and the system returns to equilibrium.

It was found that certain controls are necessary in order to obtain better results with the thyratron governor 94, and these controls, shown generally at 50, are an important part of the instant invention. The incorporation of a time delay feature, as well as a gear motor-clutch-brake electromechanical assembly (88, 90, 92) in the drive for the governor control potentiometer 86, assures smooth starting for the welding carriage drive motor 96. Relay TDR, which is time delay on energization, prevents instantaneous action of the automatic circuit after closing start switch 98. This relay is set for a delay of approximately 1½ seconds after closing switch 98 to allow the carriage to come up to speed prior to actuation of the automatic control. The initial speed of the carriage will be determined by the potentiometer setting of 86 before the automatic circuit is engaged. Relay R serves to block automatic operation unless energized through a contact of the TDR relay.

The gear motor 88, clutch 90, and brake 92, in circuit between the difference amplifier 82 and the governor potentiometer 86, work in conjunction with the relay TDR. These elements are commercially available items such as, for example, the clutch-brake assembly made by the Simplatrol Products Corporation. The gear motor 88 receives the difference voltage output $e_2$ of the difference amplifier 82 and positions the governor control potentiometer 86 in accordance with the value of the difference voltage. The clutch 90 is responsive to the timing relay. Thus, it will not engage to allow the drive motor 88 to rotate the potentiometer 86 until after the 1.5 second time delay has run. During the time delay period, the brake 92 locks the governor control potentiometer 86 in its initial setting.

At this point a comment should be made on certain of the elements in the circuit. Capacitors 100 and 102 are phase shift capacitors normally found in two phase motor circuits to shift the fixed phase 90 electrical degrees from the control voltage. Difference amplifiers 68 and 82 are commercially available two-phase servo amplifiers. The difference amplifier 68 is stabilized by adjusting a built-in notch-T filter. Difference amplifier 82 is a chopper stabilized, two phase servo amplifier employing 120 cycle motor dampening.

From the foregoing, it may be seen that applicant has invented an automatic weld torch speed control which is reliable and exceptionally accurate in its response, yet may be built of lightweight and relatively inexpensive components. The speed pickoff wheel is quite reliable since it is not subject to slippage even on a relatively slick smooth surface. The electrical system can maintain the angular rotation of the pickup wheel within plus or minus one percent accuracy. The control system does not depend on an analog work speed signal, but is controlled by synchros whose shaft positions must remain synchronized. The tachometer generator output is a direct gear ratio to the synchro speed; hence, tachometer speed is accomplished electrically and not mechanically. The operation of the circuit depends only on maintaining zero or near zero signals into the amplifiers; therefore, no linear amplifiers are required, and the system is completely closed loop. Also, the electrical system is independent of error due to other variables such as: relatively large changes in system gain of the order of plus or minus 10 percent, tube and component drift and aging, wide changes in drive motor load, amplifier nonlinearity, thyratron output nonlinearity, and voltage drop in long cables. Provision for rolling a small pickup wheel on the work surface near the torch is the only preparation necessary. No programming, computer computation, gearing of the speed sensing device to the work, special adhesive tapes, or other aids are required for successful utilization as a constant work speed controller. Lastly, the system incorporates time delay and governor control features which allow unusually smooth starting and reliability for the carriage drive motor.

Obviously, numerous modifications and variations of the present invention are possible in the light of the above teachings. It is therefore to be understood that within the scope of the appended claims, the invention may be practiced otherwise than as is specifically described.

What is claimed is:

1. In a device for welding curved surfaces, an automatic welding torch speed controller comprising:
    (a) a welding torch mounted on a carriage having a carriage drive motor,
    (b) a velocity tracker, responsive to the movement of the torch,
    (c) an analog generator operatively connected to the velocity tracker, for generating a voltage proportional to the instantaneous speed of the tip of said torch,
    (d) reference voltage supply means in circuit with the said analog generator, for supplying a voltage representing a desired constant speed for the tip of the welding torch,
    (e) servoamplifier means connected to the outputs of the said analog generator and the said reference voltage supply means for comparing the two voltage outputs and furnishing a difference voltage,
    (f) motor governor means for said carriage drive motor, connected to said servoamplifier means, whereby the speed of the motor may be controlled in accordance with the difference voltage, so as to maintain a substantially constant work speed for the tip of the said welding torch.

2. In a device for welding curved surfaces, an automatic welding torch speed controller comprising:
    (a) a welding torch mounted on a carriage having a carriage drive motor,
    (b) a velocity tracker responsive to the movement of the torch, including torch speed sensing means, and synchro means coupled to the speed sensing means,
    (c) an analog generator operatively connected to the velocity tracker, for generating a voltage proportional to the instantaneous speed of the tip of said torch,
    (d) reference voltage supply means in circuit with the said analog generator, for supplying a voltage representing a desired constant speed for the tip of the welding torch,
    (e) servoamplifier means connected to the outputs of the said analog generator and the said reference voltage supply means for comparing the two voltage outputs and furnishing a difference voltage,
    (f) motor governor means for said carriage drive motor, connected to said servoamplifier means, whereby the speed of the said carriage drive motor may be varied in accordance with the difference voltage, so as to maintain a substantially constant work speed for the tip of the welding torch.

3. The combination of claim 2 wherein the said motor governor means includes a governor control potentiometer and a thyratron governor.

4. The combination of claim 3 including a gear motor, a clutch and a brake, said gear motor being coupled to the thyratron governor through the clutch, the brake, and the potentiometer, said gear motor being responsive to the difference voltage output of the said servo amplifier means, the clutch being operative to disconnect the said amplifier from the said governor and the brake being operative to lock the said control potentiometer in position when the clutch is disengaged.

5. The combination of claim 2 wherein the said velocity tracker includes a speed sensing wheel connected to the said synchro means.

6. The combination of claim 2 wherein the said synchro means comprise a control transmitter connected to a control transformer.

7. The combination of claim 6 wherein the said velocity tracker includes a speed sensing wheel which is directly connected to the said control transmitter.

8. The combination of claim 7 wherein the said velocity tracker includes a drive motor coupled to the said synchro control transformer, and an amplifier in circuit with the control transformer and the motor, said amplifier operative to receive error signals from the control transmitter through the control transformer and transmit the signals to the motor, so as to cause the motor to rotate the said synchro control transformer in a direction to reduce the error signal.

9. In a device for welding curved surfaces, an automatic welding torch speed controller comprising:
    (a) a welding torch mounted on a carriage having a carriage drive motor,
    (b) a velocity tracker responsive to the movement of the torch including a speed sensing wheel directly connected to a synchro control transmitter, a synchro control transformer connected to the said transmitter, a drive motor geared to the said synchro transformer, and a difference amplifier in circuit with the said synchro transformer and the drive motor, said amplifier operative to receive error signals from the synchro control transmitter through the synchro transformer and transmit the signals to the drive motor, so as to cause the motor to rotate the synchro transformer in a direction to reduce the error signals, (c) a rate-generator driven by said drive motor, for generating a voltage proportional to the instantaneous speed of the tip of said torch, (d) reference voltage supply means in circuit with the said rate-generator, for supplying a voltage representing a desired constant speed for the tip of the welding torch, (e) servoamplifier means connected to the output of the said rate generator and the said reference voltage supply means for comparing the two voltage outputs and furnishing a difference voltage, (f) motor governor means for said carriage drive motor, connected to said servoamplifier means, including a governor control potentiometer and a thyratron governor, (g) means for connecting the servoamplifier to the governor, including a gear motor operatively connected to a clutch and a brake, said gear motor being responsive to the difference voltage output of the said servoamplifier, the clutch being operative to disconnect the said servoamplifier from the said governor and the brake being operative to lock the said control potentiometer in position when the clutch is disengaged, (h) whereby the speed of the said carriage drive motor may be varied in accordance with the difference voltage, so as to maintain a substantially constant work speed for the tip of the welding torch.

10. The combination of claim 9 wherein the motor governor receives its control power through a time delay means, so as to allow the welding torch carriage to come up to speed prior to actuation of the automatic speed control.

References Cited
UNITED STATES PATENTS 3,216,641 11/1965 Brems.
3,268,805 8/1966 Normando.

RICHARD H. EANES, JR., *Primary Examiner.*